(No Model.)

J. K. P. RENFROE.
TOOL FOR CUTTING SLOTS IN RAILS.

No. 274,659. Patented Mar. 27, 1883.

WITNESSES:
Chas. T. Howell,
C. Sedgwick

INVENTOR:
J. K. P. Renfroe
BY Munn & Co.
ATTORNEYS.

UNITED STATES PATENT OFFICE.

JAMES K. POLK RENFROE, OF PRENTISS, GEORGIA.

TOOL FOR CUTTING SLOTS IN RAILS.

SPECIFICATION forming part of Letters Patent No. 274,659, dated March 27, 1883.

Application filed December 5, 1882. (No model.)

*To all whom it may concern:*

Be it known that I, JAMES K. POLK RENFROE, of Prentiss, in the county of Appling and State of Georgia, have invented a new and Improved Tool for Cutting Slots in Rails, of which the following is a full, clear, and exact description.

My invention consists in a tool for cutting slots in the flanges of railroad-rails, the tool being especially intended for use in repairs of railways when it is not practicable nor convenient to send the rails to a shop. The construction and arrangement are set forth hereinafter with reference to the accompanying drawings.

Figure 1:
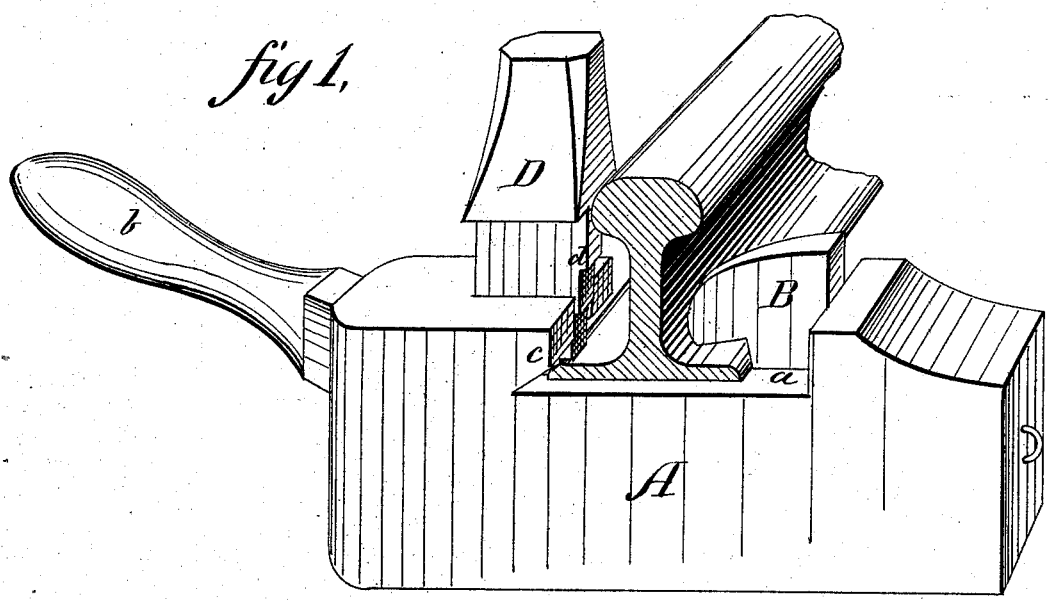
Figure 2:
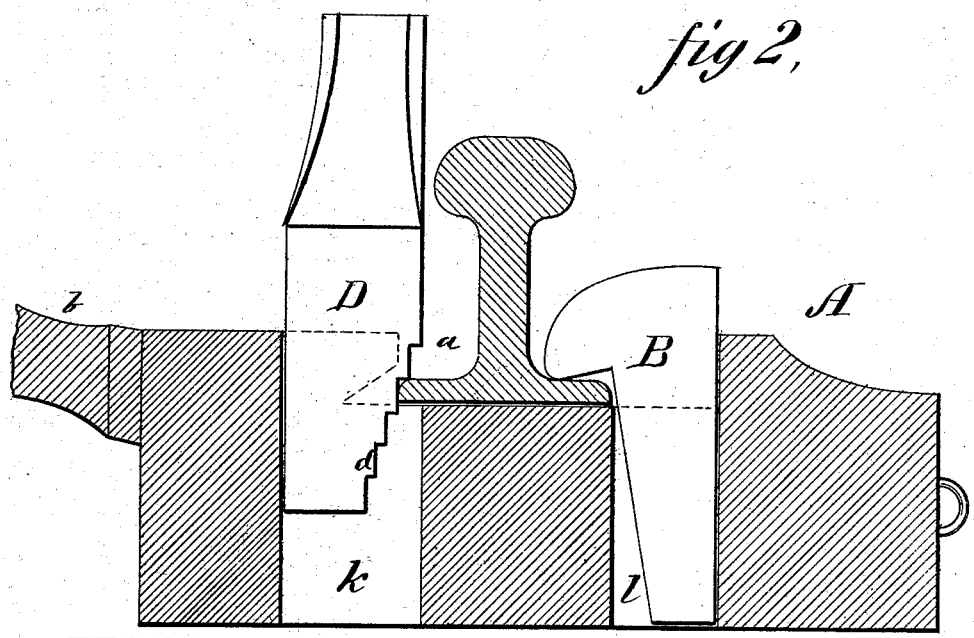

Figure 1 is a side perspective view of my improved tool. Fig. 2 is a longitudinal section of the same, illustrating its method of use.

A is a block or anvil, preferably made of steel, and formed with a recess, $a$, on its upper side for receiving the rail. This anvil may be made of any suitable size and form, and is provided with a handle, $b$, for convenience. The recess $a$ is undercut at one end to form offsets, as shown at $c$, to receive one flange of the rail. The other end is formed square, as shown, and at that end of the recess $a$ the anvil is formed with a transverse slot, $l$, that is fitted with a clamping-wedge, B. In a slot, $k$, at the other end of the recess is fitted a punch, D, the forward edge of which is formed with a series of shoulders or cutters, $d$. The upper end of the punch is made of a size and form for receiving the blows of a sledge, and it is also made with side shoulders which rest upon the anvil A when the punch is fully inserted.

In operation the end of the rail to be slotted is placed upon the anvil A, with the flange in which the slot is to be cut placed beneath the offset $c$. The wedge B is then to be inserted and driven down to clamp the rail. The punch is then to be put in place, with one of its cutters $d$ resting upon the flange of the rail, and being then struck with a sledge the punch will cut out the flange and form a clean square-cornered slot therein. Either cutter $d$ will take upon the flange, according to the adjustment of the rail or according to its width, and, if desired, the cut may be gradually deepened by using the cutters in succession.

With this tool the work of slotting railroad-rails can be done much more rapidly than by the usual method of using a cold-chisel, and in a much superior manner. The cut made by the punch being square and true, the spikes will be held in place securely. This tool thus not only saves time and labor, but insures greater safety on all railroads using rail-chairs for carrying the ends of rails.

Having thus described my invention, I claim as new and desire to secure by Letters Patent—

1. The slot-cutter consisting of the anvil A, formed with the recess $a$, and provided with a punch, D, fitted in a transverse slot of the anvil, substantially as shown and described.

2. The combination, with the anvil A, formed with recess $a$ and transverse slots $k$ $l$, of the clamping-wedge B and punch D, substantially as shown and described.

3. The combination, with slotted anvil A, of the punch D, formed with cutters $d$, substantially as shown and described.

JAMES K. POLK RENFROE.

Witnesses:
J. W. BAXLEY,
MATHEW JOHNSON.